United States Patent [19]

Weiler et al.

[11] 4,394,833
[45] Jul. 26, 1983

[54] BRAKE BOOSTER

[75] Inventors: Rolf Weiler, Frankfurt am Main-Sindlingen; Wilfried Wagner, Frankfurt am Main, both of Fed. Rep. of Germany

[73] Assignee: ITT Industries, Inc., New York

[21] Appl. No.: 239,736

[22] Filed: Mar. 2, 1981

[30] Foreign Application Priority Data

Apr. 19, 1980 [DE] Fed. Rep. of Germany ....... 3015187

[51] Int. Cl.³ ............................................... F15B 9/10
[52] U.S. Cl. ................................. 91/376 R; 91/369 A; 60/547.1
[58] Field of Search ............. 91/369 A, 369 B, 376 R; 60/547 R

[56] References Cited

FOREIGN PATENT DOCUMENTS 2922299 12/1979 Fed. Rep. of Germany ... 91/369 A
2053395 2/1981 United Kingdom ............. 91/369 A Primary Examiner—Paul E. Maslousky
Attorney, Agent, or Firm—John T. O'Halloran; Alfred C. Hill

[57] ABSTRACT

A low-pressure brake booster for automotive vehicles includes a low-pressure casing which is sealingly subdivided into a low-pressure chamber and a working chamber by an axially movable wall. The axially movable wall includes a flexible diaphragm abutting a diaphragm plate made of plastic. The diaphragm plate has a hub whose end surface is connected in a catching engagement with a metallic spacer ring. The spacer ring has radial ribs that extend through slots of a central reinforcement tube for the casing and transmits the boosting force from the diaphragm plate onto a control valve housing disposed internally of the tube. Latches extending from the diaphragm plate engage by means of detents behind the spacer ring and form a centering arrangement for a compression spring which urges the spacer ring against the hub of the diaphragm plate and, hence, the diaphragm plate into its inoperative position.

10 Claims, 6 Drawing Figures

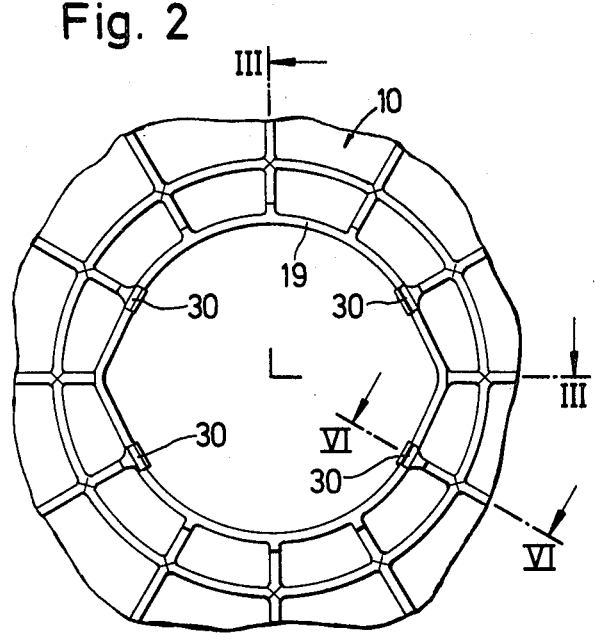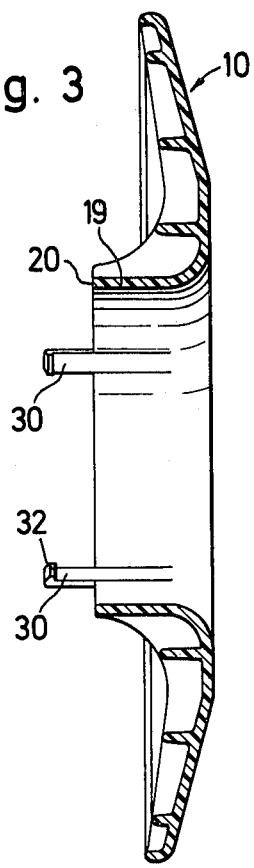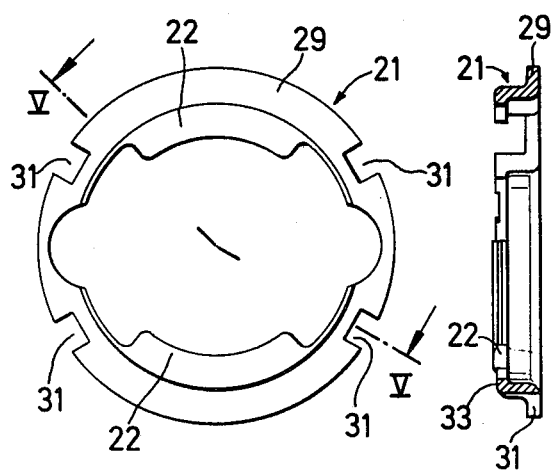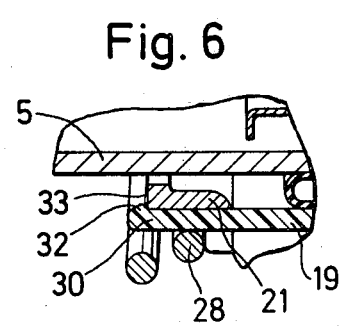

BRAKE BOOSTER

BACKGROUND OF THE INVENTION

The present invention relates to a brake booster for use in automotive vehicles comprising a low-pressure casing sealingly subdivided into a low-pressure chamber and a working chamber by an axially movable wall, the wall having a rigid diaphragm plate and a flexible diaphragm, a reinforcement tube extending axially through the low-pressure casing having its ends fastened to the two end walls of the low-pressure casing, and a mechanically actuatable control valve to connect the working chamber to the low-pressure chamber or to atmosphere, the control valve housing of the control valve being axially movable in the reinforcement tube is in a force-transmitting connection with an actuating piston of a master cylinder and communicates with radial ribs of the movable wall, the ribs projecting through slots in the reinforcement tube.

When striving for a desired weight reduction of automotive vehicles, it is desirable to keep the weight of the brake booster as light as possible.

The transmission of the forces acting between the master cylinder and the brake booster components fastened to the automotive vehicle via a reinforcement tube extending through the low-pressure casing relieves the forces acting on the low-pressure casing so that the casing may be of a very light-weight construction, for instance, of comparatively thin sheet metal or of plastics.

To the end that the overall length of the brake booster be reduced, the diaphragm plate forming the rigid main portion of the axially movable wall was formed integrally with radial ribs, which project through slots into the reinforcement tube to be there connected to a sleeve, which is, on its part, connected to the control valve housing. Such a construction is disclosed in U.S. copending application of R. Becht-P. Bohm, Ser. No. 142,298, filed Apr. 21, 1980, assigned to the same assignee as the present application.

The brake-boosting force generated by the axially movable wall of the above-cited copending application will be transmitted via the radial ribs onto the control valve housing and from there onto the actuating piston of the master cylinder of the brake unit. Because of the comparatively great bending stress occurring in the radial ribs, the diaphragm plate with the radial ribs formed integrally therewith was made of sheet metal and was, as a result, of comparatively heavy weight.

SUMMARY OF THE INVENTION

It is, therefore, an object of the present invention to to provide an improved brake booster of the type referred to hereinabove having a diaphragm plate of a very light-weight construction without having to put up with a weakening of the radial ribs, which ribs are subjected to great bending stress, and yet not complicating manufacture and assembly of the brake booster.

A feature of the present invention is the provision of a brake booster for automotive vehicles comprising a low-pressure casing having a longitudinal axis sealingly subdivided into a low-pressure chamber and a working chamber by an axially movable wall, the wall including a flexible diaphragm and a rigid diaphragm plate having a hub disposed coaxially of the axis extending into the low-pressure chamber, the hub having an annular end surface in the low-pressure chamber; a reinforcement tube disposed coaxially of the axis extending through the casing having its ends fastened to end walls of the casing, the tube having slots therein parallel to the axis; a mechanically actuatable control valve to connect the working chamber to a selected one of the low-pressure chamber and atmosphere, the control valve being disposed in a control valve housing which is axially movable in the tube in a force-transmitting relationship with a master cylinder piston actuating rod; and a metallic spacer ring disposed coaxially of the axis in an abutting relationship with the annular end surface, the spacer ring having radially extending ribs projecting through the slots in a force transmitting relationship with the control housing to transmit boosting forces from the wall to the control housing, the spacer ring being secured to the annular surface by a lock-in connection.

Separating the construction of the diaphragm plate from that of the spacer ring incorporating the radial ribs renders it possible to construct the diaphragm plate, which will then be subjected to relatively insignificant loads only, of very light-weight material, preferably a plastic material. The transmission of the boosting force between the diaphragm plate and the spacer ring is effected in a manner which excludes unwelcome force peaks at the diaphragm plate, namely, by the spacer ring simply abutting an end surface of the hub member. The introduction of force into the diaphragm plate is, therefore, done via a large surface so that damage to the diaphragm plate made of plastic will be impossible to occur. The lock-in connection enables ease of assembly and keeps the spacer ring safely in abutment with the diaphragm plate.

In a particularly favorable embodiment of the invention, the spacer ring is centered on at least three latches which engage in each case with a detent behind a catching surface at the spacer ring. By this simple method, the spacer ring is held at the diaphragm plate and centered at the same time. Preferably, the detents are formed integrally with the diaphragm plate resulting in no separate component parts being necessary for this connection and centering.

A compression spring urging the diaphragm plate into its initial position expediently bears against a radially outwardly projecting shoulder of the spacer ring so that the introduction of force from this compression spring into the diaphragm plate does not take place directly at a plastic surface, but rather is loaded to a minor degree only by the intermediary of the metallic spacer ring, which will, in turn, transmit this force via the end surface of the hub member of the diaphragm plate. At the same time, with the compression spring arranged this way, the spacer ring is urged constantly against the diaphragm plate and is retained in this position so that the detends of the latches are relieved of forces to the greatest possible extent and their sole purpose is to keep the spacer ring at the diaphragm plate during the assembly.

In a particularly advantageous embodiment, the outwardly projecting shoulder of the spacer ring includes passages for the latches, with the compression spring bearing against the latches from the outside and being centered by the latches. This arrangement results in the compression spring supporting the latches from the outside resulting in the latches being inhibited from being deformed outwardly, even if they are of a comparatively thin and elastic construction. Even if the latches are formed integrally with the plastic material of the diaphragm plate, loadable to a comparatively minor degree only, any damage caused to the latches on account of the supporting effect of the compression spring is avoided, while the latches, on their part, take care of the centering of the compression spring.

BRIEF DESCRIPTION OF THE DRAWING

Above-mentioned and other features and objects of this invention will become more apparent by reference to the following description taken in conjunction with the accompanying drawing, in which:

FIG. 2 is a partial front view of the diaphragm plate of the brake booster of FIG. 1;

FIG. 3 is a cross-section of the diaphragm plate taken along line III—III in FIG. 2, which also indicates the position of the sectional planes for FIG. 1;

FIG. 4 is a front view of the spacer ring of the brake booster of FIG. 1;

FIG. 5 is a cross-section taken along line V—V in FIG. 4; and

FIG. 6 is an enlarged view, partially in cross-section, of the spacer ring in the area of the connection with a latch, with the sectional plane corresponding to line VI—VI in FIG. 2.

DESCRIPTION OF THE PREFERRED EMBODIMENT

Figure 1:
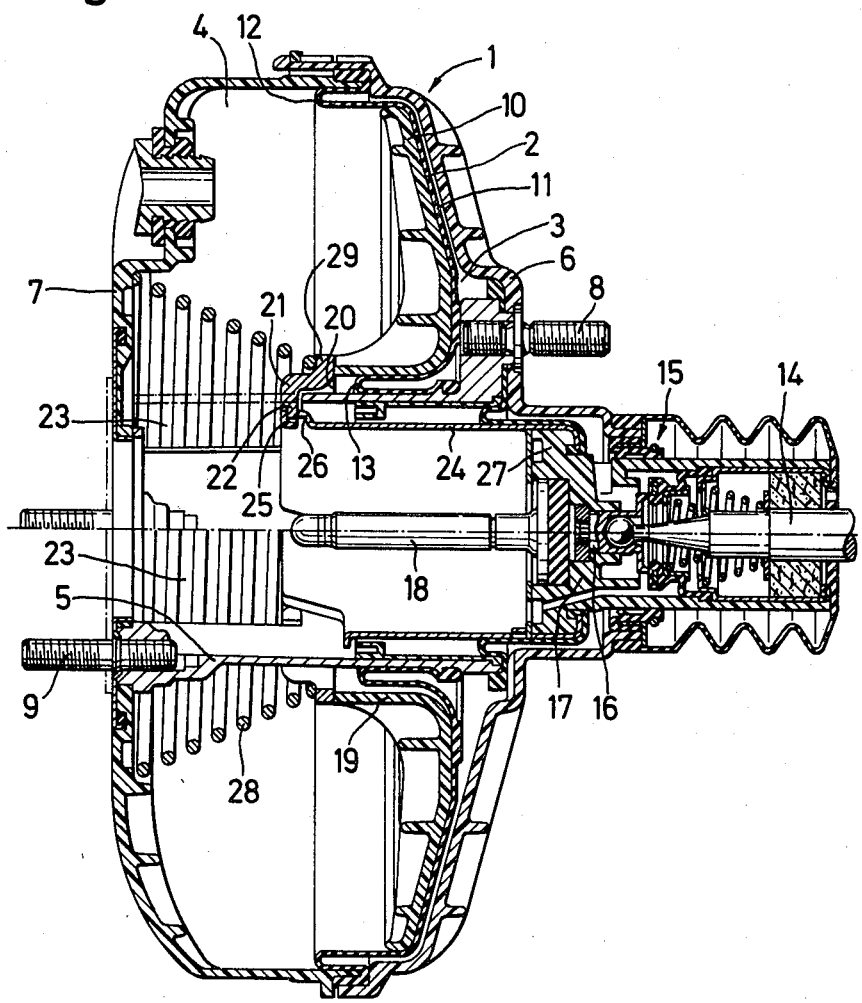
FIG. 1 is a longitudinal cross-sectional view of a brake booster in accordance with the principles of the present invention.

The brake booster shown in FIG. 1 includes a low-pressure casing 1 which is made of plastics in the illustrated embodiment and is divided into a working chamber 3 and a low-pressure chamber 4 by an axially movable wall 2. Extending axially through low-pressure casing 1 is a reinforcement tube 5 having its ends fastened to the two end walls 6 and 7 by means of threaded bolts 8 and 9, respectively.

Axially movable wall 2 includes a diaphragm plate 10 made of plastic material, preferably of thermoplastics, and a diaphragm 11 resting thereon which forms a rolling diaphragm 12 in the area between the outer preiphery of diaphragm plate 10 and the circumferential wall of low-pressure casing 1 and another rolling diaphragm 13 in the area between diaphragm plate 10 and reinforcement tube 5. These two rolling diaphragms seal movable wall 2 relative to low-pressure casing 1 and reinforcement tube 5.

A control valve 15 actuatable by a piston rod 14 is disposed at the end of reinforcement tube 5 close to working chamber 3 and has a control valve piston 16 connected to piston rod 14, which opens valve openings in a control valve housing 17 such that working chamber 3 is connected to low-pressure chamber 4 in the inactivated position illustrated in FIG. 1. When control valve 15 is actuated, i.e., when the piston rod 14 is axially displaced, the connection between low-pressure chamber 4 and working chamber 3 is interrupted, and working chamber 3 is connected to atmosphere so that movable wall 2 will move towards low-pressure chamber 4.

The axially movable valve housing 17 is connected to a push rod 18 which acts upon an actuating piston of a (non-illustrated) master cylinder of the brake unit, the master cylinder being secured to the end of reinforcement tube 5 on the low-pressure-chamber side by means of threaded bolts 9.

Diaphragm plate 10 is reinforced at the surface thereof adjacent low-pressure-chamber 4 by radial fins and circumferential fins (FIGS. 2 and 3) and includes a substantially cylindrical hub member 19 having a plane end surface 20.

Bearing against end surface 20 is a metallic spacer ring 21 which is, for example, made of deep-drawn aluminum sheet metal. Two radial ribs 22 of spacer ring 21 project inwardly through slots 23 of reinforcement tube 5 and are there connected to a sleeve 24 by means of a radiallly projecting collar 25 and an indentation 26. Sleeve 24 engages behind a shoulder 27 projecting outwardly from control valve housing 17.

The boosting force caused by axially movable wall 2 is transmitted to the actuating piston of the master cylinder via diaphragm plate 10, its hub member 19, spacer ring 21, sleeve 24, control valve housing 17 and push rod 18.

A compression spring 28 bears, on the one hand, against end wall 7 of low-pressure casing 1 and, on the other hand, against an outwardly projecting shoulder 29 of spacer ring 21. Spring 28 urges diaphragm plate 10 into the initial position shown in FIG. 1, while simultaneously keeping spacer ring 21 in constant abutment with end surface 20 of diaphragm plate 10.

Four resilient latches 30 project from hub member 19 beyond the end surface 20 (FIGS. 2 and 3) and extend through passages 31 which interrupt shoulder 29 of spacer ring 21 (FIGS. 4 and 5).

Resilient latches 30 each have at their free ends a detent 32 projecting inwardly and beveled axially outwardly. Detents 32 engage behind a catching surface 33 formed in spacer ring 21. Latches 30 extend in the actuating direction and will, therefore, not be loaded upon transmission of the boosting force, because detents 32—looked upon in the actuating direction—are placed before catching surface 33. The restoring force of spring 28, which is of a considerably lower value than the boosting force, will be transmitted via detents 32 and latches 30.

As may be seen from FIG. 6, the last coil of compression spring 28 adjacent working chamber 3 abuts latches 30 from the outside. Compression spring 28 is centered on latches 30 and simultaneously supports latches 30 from the outside, so that the catching engagement of detents 32 at spacer ring 21 is not permitted to disengage as long as compression spring 28 extends over latches 30.

While we have described above the principles of our invention in connection with specific apparatus, it is to be clearly understood that this description is made only by way of example and not as a limitation to the scope of our invention as set forth in the objects thereof and in the accompanying claims.

We claim:

1. A brake booster for automotive vehicles comprising:
    a low-pressure casing having a longitudinal axis sealingly subdivided into a low-pressure chamber and a working chamber by an axially movable wall, said wall including a flexible diaphragm and a rigid diaphragm plate having a cylindrical hub disposed coaxially of said axis extending into said low-pressure chamber, said hub having an annular end surface in said low-pressure chamber:
    a reinforcement tube disposed coaxially of said axis concentrically within said hub extending through said casing having its ends fastened to end walls of said casing, said tube having slots therein parallel to said axis, the outer surface of said tube being closely adjacent the inner surface of said hub;

a mechanically actuatable control valve to connect said working chamber to a selected one of said low-pressure chamber and atmosphere, said control valve being disposed in a control valve housing which is axially movable in said tube in a force-transmitting relationship with a master cylinder piston actuating rod; and a metallic spacer ring having a radially outwardly projecting shoulder outside said tube disposed coaxially of said axis in an abutting relationship with said annular end surface, said spacer ring having radially extending ribs projecting through said slots in a force-transmitting relationship with said control housing to transmit boosting forces from said wall to said control housing, said spacer ring being secured to said annular end surface by a lock-in connection means extending axially into said low-pressure chamber from said annular end surface.

2. A brake booster according to claim 1, wherein said diaphragm plate is made of plastic.

3. A brake booster according to claims 1 or 2, wherein
said spacer ring is centered by said connection means including at least three latches extending from said annular end surface, each of said three latches having a detent to engage a catching surface of said spacer ring adjacent said low-pressure chamber.

4. A brake booster according to claim 3, wherein said three latches are formed integral with said hub.

5. A brake booster according to claim 3, wherein said three latches extend in an actuating direction of said booster and said detents and said three latches are not loaded upon transmission of boosting forces.

6. A brake booster according to claim 3, further including
a compression spring to urge said diaphragm plate into its inoperative position bearing against said radially outwardly projecting shoulder of said spacer ring.

7. A brake booster according to claim 6, wherein said shoulder includes passages therein for said three latches, and
said spring abuts said three latches from the outside and is centered by said three latches.

8. A brake booster according to claim 1, further including
a compression spring to urge said diaphragm plate into its inoperative position bearing against said radially outwardly projecting shoulder of said spacer ring.

9. A brake booster for automotive vehicles comprising:

a low-pressure casing having a longitudinal axis sealingly subdivided into a low-pressure chamber and a working chamber by an axially movable wall, said wall including a flexible diaphragm and a rigid diaphragm plate having a hub disposed coaxially of said axis extending into said low-pressure chamber, said hub having an annular end surface in said low-pressure chamber;

a reinforcement tube disposed coaxially of said axis extending through said casing having its ends fastened to end walls of said casing, said tube having slots therein parallel to said axis;

a mechanically actuatable control valve to connect said working chamber to a selected one of said low-pressure chamber and atmosphere, said control valve being disposed in a control valve housing which is axially movable in said tube in a force-transmitting relationship with a master cylinder piston actuating rod;

a metallic spacer ring disposed coaxially of said axis in an abutting relationship with said annular end surface, said spacer ring having radially extending ribs projecting through said slots in a force-transmitting relationship with said control housing to transmit boosting forces from said wall to said control housing, said spacer ring being secured to said annular end surface by a lock-in connection means;

said spacer ring being centered by said connecting means including at least three latches extending from said hub, each of said three latches having a detent to engage a catching surface of said spacer ring adjacent said low-pressure chamber; and a compression spring to urge said diaphragm plate into its inoperative position bearing against a radially outwardly projecting shoulder of said spacer ring, said shoulder including passages therein for said three latches, and said spring abuts said three latches from the outside and is centered by said three latches.

10. A brake booster according to claim 9, wherein said diaphragm plate is made of plastic.

* * * * *